US012619723B1

(12) United States Patent
Ciancaglini et al.

(10) Patent No.: US 12,619,723 B1
(45) Date of Patent: May 5, 2026

(54) IDENTIFYING MALICIOUS CONTENTS THAT ARE STORED IN DISTRIBUTED HASH TABLE NETWORKS

(71) Applicant: Trend Micro Incorporated, Yoyogi (JP)

(72) Inventors: Vincenzo Ciancaglini, Rueil-Malmaison (FR); Morton Swimmer, Wedel (DE); Roel Sotto Reyes, Pasig (PH)

(73) Assignee: Trend Micro Incorporated, Tokyo (JP)

( * ) Notice: Subject to any disclaimer, the term of this patent is extended or adjusted under 35 U.S.C. 154(b) by 233 days.

(21) Appl. No.: 18/503,645

(22) Filed: Nov. 7, 2023

(51) Int. Cl.
*G06F 21/00* (2013.01)
*G06F 21/56* (2013.01)
*H04L 9/40* (2022.01)

(52) U.S. Cl.
CPC ........ *G06F 21/565* (2013.01); *H04L 63/1433* (2013.01); *H04L 63/145* (2013.01)

(58) Field of Classification Search
CPC .. G06F 21/565; H04L 63/1433; H04L 63/145
See application file for complete search history.

(56) References Cited

U.S. PATENT DOCUMENTS

| | | | | | |
|---|---|---|---|---|---|
| 10,044,675 | B1 * | 8/2018 | Ettema | ................ | H04L 63/0227 |
| 10,650,146 | B1 * | 5/2020 | Gaurav | ................ | G06F 21/562 |
| 2021/0312066 | A1 * | 10/2021 | Hansen | ............... | G06F 11/1451 |

OTHER PUBLICATIONS

Ankur Saini and Charlie Gardner, "Charming Kitten Updates PoweStar with an InterPlanetary Twist", Volexity, Jun. 28, 2023, https://www.volexity.com/blog/2023/06/28/charming-kitten-updates-powerstar-with-an-interplanetary-twist/.
"Content Centric Networking", Wikipedia, Downloaded Oct. 17, 2023, https://en.wikipedia.org/wiki/Content_centric_networking#:~:text=It.
"Content-Addressable Network", Wikipedia, Downloaded Oct. 5, 2023, https://en.wikipedia.org/wiki/Content-addressable_network.
"Distributed Hash Table", Wikipedia, Downloaded Oct. 5, 2023, https://en.wikipedia.org/wiki/Distributed_hash_table.
Paul Krzyzanowski, "Distributed Lookup Services", Mar. 2009, https://people.cs.rutgers.edu/%7Epxk/rutgers/notes/content/dht.html#:~:text=In.
"Filecoin and IPFS", Filecoin Docs, Downloaded Oct. 5, 2023, https://docs.filecoin.io/basics/how-storage-works/filecoin-and-ipfs.
"InterPlanetary File System", Wikipedia, Downloaded Oct. 5, 2023, https://en.wikipedia.org/wiki/InterPlanetary_File_System.
"Overlay Network", Wikipedia, Downloaded Oct. 9, 2023, https://en.wikipedia.org/wiki/Overlay_network.
"Web3" Wikipedia, Downloaded Oct. 5, 2023, https://en.wikipedia.org/wiki/Web3.

* cited by examiner

*Primary Examiner* — Jeffrey C Pwu
*Assistant Examiner* — Thong P Truong
(74) *Attorney, Agent, or Firm* — Beyer Law Group LLP

(57) ABSTRACT

Method and system for evaluating contents stored in a Distributed Hash Table (DHT) network are described. Contents are stored as chunks across nodes of the DHT network. Contents are subjected to cybersecurity evaluations to generate risk histories of the chunks. A reputation of a target content is determined based on corresponding risk histories of individual chunks that are present in the target content.

11 Claims, 7 Drawing Sheets

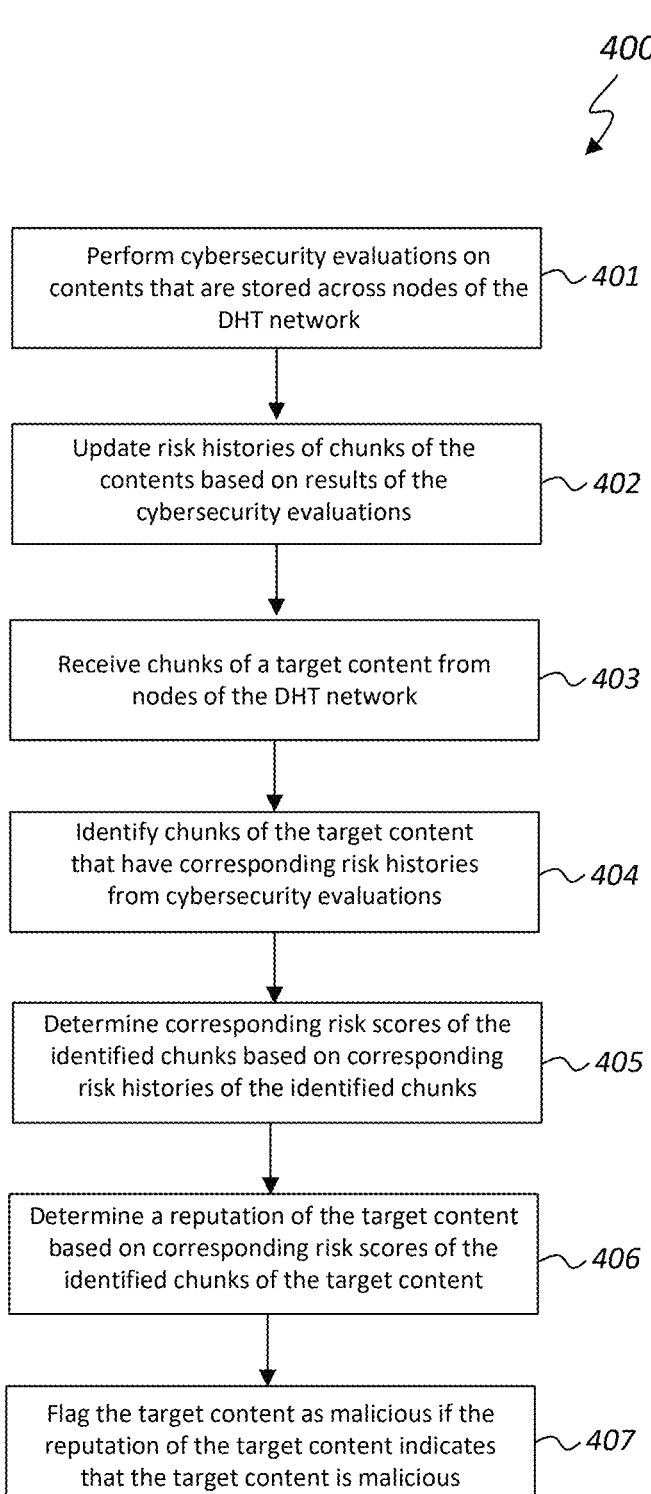

*400*

Perform cybersecurity evaluations on contents that are stored across nodes of the DHT network — *401*

Update risk histories of chunks of the contents based on results of the cybersecurity evaluations — *402*

Receive chunks of a target content from nodes of the DHT network — *403*

Identify chunks of the target content that have corresponding risk histories from cybersecurity evaluations — *404*

Determine corresponding risk scores of the identified chunks based on corresponding risk histories of the identified chunks — *405*

Determine a reputation of the target content based on corresponding risk scores of the identified chunks of the target content — *406*

Flag the target content as malicious if the reputation of the target content indicates that the target content is malicious — *407*

IDENTIFYING MALICIOUS CONTENTS THAT ARE STORED IN DISTRIBUTED HASH TABLE NETWORKS

TECHNICAL FIELD

The present disclosure is directed to cybersecurity.

BACKGROUND

Distributed Hash Table (DHT) networks allow for distributed storage of content across a plurality of peer nodes. Examples of DHT networks include Content-Addressable Networks, Interplanetary File System (IPFS) networks, etc.

Generally, DHT networks employ a DHT algorithm that follow the following set of principles: (a) nodes of the DHT network and contents are assigned an identifier (ID), which is usually a hash of the content or the hash of a node's fingerprint; (b) node and content IDs are mapped in the same addressing space, i.e. they use the same hash algorithm; (c) each node is responsible for a partition of the addressing space, hence each node will be responsible to store chunks (i.e., portions) of content whose ID falls in that partition; (d) nodes maintain a logical routing table of other nodes in the network that they discovered; and (e) routing of network messages (e.g., messages for putting content, getting content, and finding node IDs) is content based, i.e. depends on the content ID or node ID. Routing may also be based on locality properties, such as geographical or network proximity of the nodes, in which case the locality properties may be included in the node hashing function to retain nodes that are close together in terms of physical, network, or geographic location or in terms of addressing space. Messages are routed from one node to another until they find the node that is responsible according to the partitioning metric.

Because content is stored as separate chunks in different nodes, evaluating the content for maliciousness can be very difficult. An attacker (i.e., malicious actor) can exploit the way files and folders are divided into chunks to create a malicious payload that is divided into several pieces, which are distributed as part of seemingly harmless content and subsequently individually fetched and reassembled at a victim computer. For example, an attacker can hide some cryptominer code that is left inactive as part of a seemingly harmless website. At a later stage of the attack, only the content ID of the cryptominer code is needed to retrieve and reassemble the chunks of the cryptominer code at the victim computer. Because the content ID is not necessarily malicious and all of the chunks are not stored in the victim computer, the maliciousness of the cryptominer code is very difficult to detect before its activation.

BRIEF SUMMARY

In one embodiment, contents are stored as chunks across nodes of a DHT network. The contents are subjected to cybersecurity evaluations, which may be by one or more cybersecurity authorities. Each chunk of the contents has a risk history from the results of the cybersecurity evaluations. Risk scores of chunks of the contents are determined based on the risk histories of the chunks of the contents. A reputation of a target content is determined based on risk histories of chunks that are present in the target content. For example, an overall risk score of the target content may be calculated from risk scores of chunks that are present in the target content. The overall risk score may be compared to a threshold to determine the reputation of the target content.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 6 shows a flow diagram of a method of evaluating contents stored in a DHT network for maliciousness, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
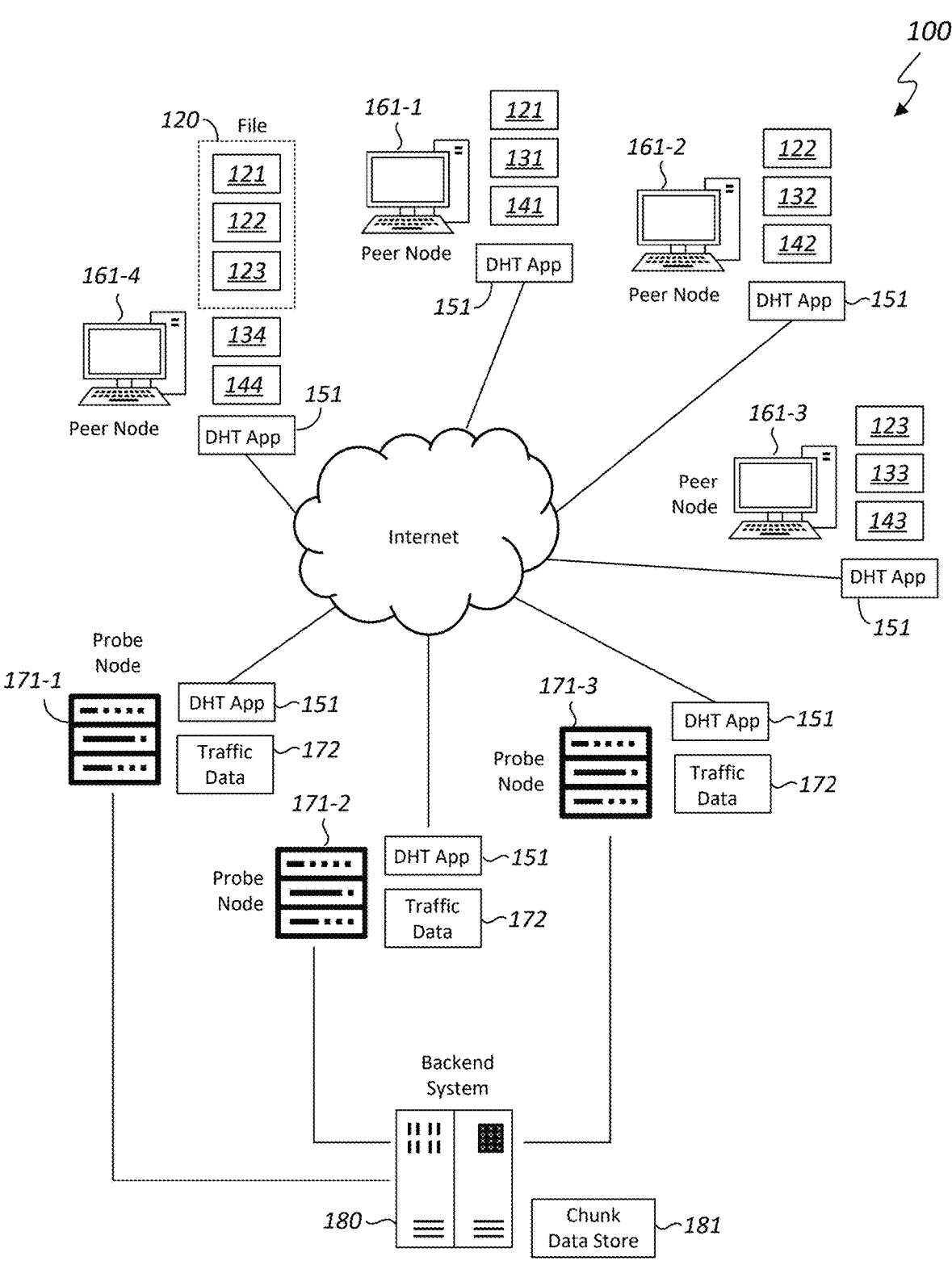
FIG. 1 shows a block diagram of a Distributed Hash Table (DH) network, in accordance with an embodiment of the present invention.

FIG. 1 shows a block diagram of a Distributed Hash Table (DHT) network 100, in accordance with an embodiment of the present invention. As can be appreciated, embodiments of the present invention are generally applicable to DHT networks and other content-centric networks.

In the example of FIG. 1, the DHT network 100 comprises a plurality of nodes, which are nodes 161 (i.e., 161-1, 161-2, 161-3, 161-4, etc.) and nodes 171 (i.e., 171-1, 171-2, 171-3, etc.). The nodes of the DHT network 100 may communicate over the public Internet. A node comprises a computer system that stores and retrieves content in accordance with the DHT algorithm of the DHT network 100. Embodiments of the present invention may employ a suitable, conventional DHT algorithm without detracting from the merits of the present invention. Because DHT in general is well-known, only DHT features that are relevant to the present invention are discussed herein.

All nodes of the DHT network 100, including the nodes 161 and 171, are peer nodes. The nodes 161 are simply referred to herein as peer nodes. The nodes 171 are referred to herein as probe nodes in that they serve as probes of a security system that evaluates contents stored in the DHT network 100 for maliciousness. In the example of FIG. 1, the probe nodes 171 and the backend system 180 are part of a security system of a cybersecurity authority, such as Trend Micro Incorporated, for example.

In one embodiment, the backend system 180 is a computer system that is not part of the DHT network. The backend system 180 may be implemented on dedicated server computers, cloud computing infrastructure, or other computer system. The probe nodes 171 may communicate with the backend system 180 over the public Internet.

A peer node 161 comprises a computer system that operates in conjunction with other nodes of the DHT network 100 to store content in accordance with the DHT algorithm. A node of the DHT network 100 runs a DHT application (i.e., application program) 151, which stores and retrieves content in the DHT network 100 in accordance with the DHT algorithm. For example, a user may employ a DHT application 151 running in a peer node 161-4 to store the content of a file 120 as chunks 121, 122, and 123 that are stored across nodes of the DHT network 100. In that example, the chunk 121 is stored in the peer node 161-1, the chunk 122 is stored in the peer node 161-2, and the chunk 123 is stored in the peer node 161-3. Unless differently specified, e.g., through content caching, like with IPFS pinning, content is not stored entirely in a single node A node stores chunks of other contents. In the example of FIG. 1, another content consists of chunks 131, 132, 133, and 134 that are stored in the peer nodes 161-1, 161-2, 161-3, and 161-4, respectively. Also in the example of FIG. 1, yet another content consists of chunks 141, 142, 143, and 144 that are stored in the peer nodes 161-1, 161-2, 161-3, and 161-4, respectively. Like other nodes of the DHT network 100, the probe nodes 171 may also store chunks of contents. In general, content stored in the DHT network may be that of a file, folder, blockchain transaction, media, or other data.

Each node of the DHT network 100 has an assigned node ID and each content stored in the DHT network 100 has an assigned content ID. The node ID identifies the node in the overlay network of the DHT network 100. For example, given "contentID_120" as the content ID of the file 120, a message PUT (contentID_120) will store the file 120 as chunks 121, 122, and 123 in the nodes 161-1, 161-2, and 161-3, respectively; and a message GET (contentID_120) will retrieve the chunks 121, 122, and 123 into the node that issued the GET message. In the example of FIG. 1, the DHT app 151 of the peer node 161-4 issued the message GET (contentID_120) to reassemble the file 120 in the peer node 161-4. A message FIND (nodeID) will return the IP address, port number, and/or other contact data of the node identified by "nodeID". The actual syntax of the PUT, GET, and FIND messages will vary depending on the particulars of the DHT network 100. These messages may be issued by a DHT application 151 running in a node.

Generally, any single node only has a partial view of the DHT network 100. It is practically impossible at large scale to have a complete knowledge of the entire topology of the DHT network 100. Similarly, it is practically impossible to gain a complete knowledge of all the contents stored in the DHT network 100.

The probe nodes 171 form coordinated nodes that collect traffic data 172 of the DHT network 100. The traffic data 172 include network traffic data seen by a node in the DHT network 100. More particularly, every node in the DHT network 100 is responsible for routing messages for other nodes, and every routed message carry network information (e.g., sender's node ID, requested content ID) that a routing node can see and exploit to update its routing table. The traffic data 172 also include contents and chunks of contents stored in the DHT network 100 and retrieved by the probe node 171. In the example of FIG. 1, the probe nodes 171 provide their collected traffic data 172 to the backend system 180.

Unless specifically implemented by a particular DHT algorithm aiming at exploiting locality, the pseudo random nature of the hashing algorithms allows for a statistically uniform distribution of nodes and contents across the addressing space. Accordingly, a more comprehensive view of the DHT network 100 is obtained as more probe nodes 171 are added to join the DHT network 100.

Over time, the probe nodes 171 will be able to build a catalog of contents, chunks of contents, and information on the peer nodes 161 as they monitor and collect traffic data 172 of the DHT network 100. In one embodiment, the traffic data 172 collected by the probe nodes 171 are forwarded to the backend system 180. There, risk histories of chunks of an increasingly larger sample of contents that have been retrieved by the probe nodes 171 are maintained.

A risk history of a chunk may be based on cybersecurity evaluations performed on the content that includes the chunk. The cybersecurity evaluations may be performed on the content by one or more cybersecurity authorities, such as cybersecurity vendors, cybersecurity organizations, etc. In one embodiment, the cybersecurity evaluations assign a risk score to each content, with the risk score being propagated to each individual chunk of the content. The risk score of a content may be propagated to its chunks as-is, e.g., each individual chunk of a content is given a risk score of 5 when the content has been given a risk score of 5 by a cybersecurity evaluation. The risk score of a content may be propagated to its chunks some other way depending on the particulars of the cybersecurity application. Generally, a risk score is indicative of a security risk. In one embodiment, the higher the risk score, the greater the security risk.

Over time, each chunk will accumulate a risk history from each cybersecurity evaluation performed on the content that includes the chunk. A chunk risk history may have a plurality of records, with each record indicating a risk score from a cybersecurity evaluation performed on a content that includes the chunk, a content ID of the content that includes the chunk, the cybersecurity authority that performed the cybersecurity evaluation on the content, a timestamp of the cybersecurity evaluation, etc. In the example of FIG. 1, the risk histories of chunks may be stored in a chunk data store 181 of the backend system 180. The chunk risk histories may also be stored in other data storage locations, such as across nodes of the DHT network 100, storage location that is accessible by smart contract, etc.

A chunk may be identified by an ID that contains its hash value. The chunk IDs may be compared to find matching chunks. For example, a target chunk may be hashed using a suitable hash function, and the hash of the target chunk may be compared to hashes in the chunk data store 181 to retrieve the risk history of the target chunk, if available.

A risk score of a chunk may be determined based on its risk history using a suitable algorithm, e.g., considering only risk scores coming from a specific cybersecurity authority, using a consensus algorithm across multiple cybersecurity authorities, applying an exponential window to weight out older cybersecurity evaluations, averaging the risk scores, etc. A risk score of a chunk may be pre-calculated and stored in the chunk data store 181 in the backend system 180 or other storage location for convenience, or calculated on the fly from the risk history of the chunk upon content retrieval by each individual DHT application 151.

Generally, a risk score may be converted to a designated reputation. For example, content with a risk score that exceeds a predetermined threshold may be designated to have a "malicious" reputation, and content with a risk score below the threshold may be designated to have a "normal" reputation. As another example, a chunk with a risk score that exceeds a predetermined threshold may be designated to have a "malicious" reputation, and a chunk with a risk score below the threshold may be designated to have a "normal" reputation. Content with no risk score or a chunk with no risk score may be designated to have an "unknown" reputation.

The results of cybersecurity evaluations of the contents may also be extended to nodes that provide chunks of the contents directly or by reference. More particularly, the traffic data 172 indicate nodes that store and provide chunks. The reputation of a node may be determined based on the reputation or risk scores of contents or chunks of contents provided or referenced by the node.

For example, a node that provides chunks having an average risk score that exceeds a predetermined threshold may be designated to be malicious, and a node that provides chunks having an average risk score that is below the threshold may be designated to be "normal".

Using IPFS as an example DHT network, IPFS disposes of a system for defining mutable records called InterPlanetary Name Service (IPNS). IPNS can be used as a Domain Name Service (DNS) to register Internet Protocol (IP) addresses that point to content that might be subject to change (e.g., web content to be updated). In brief, an IPNS record points to the identifier of the most recent immutable content in the IPFS network. IPNS records, have to be refreshed periodically by nodes to have them point to the most recent record. By evaluating contents stored in the IPFS network as explained above with reference to the DHT network 100, nodes responsible for posting IPNS records that point to malicious content may be identified and flagged.

Figure 2:
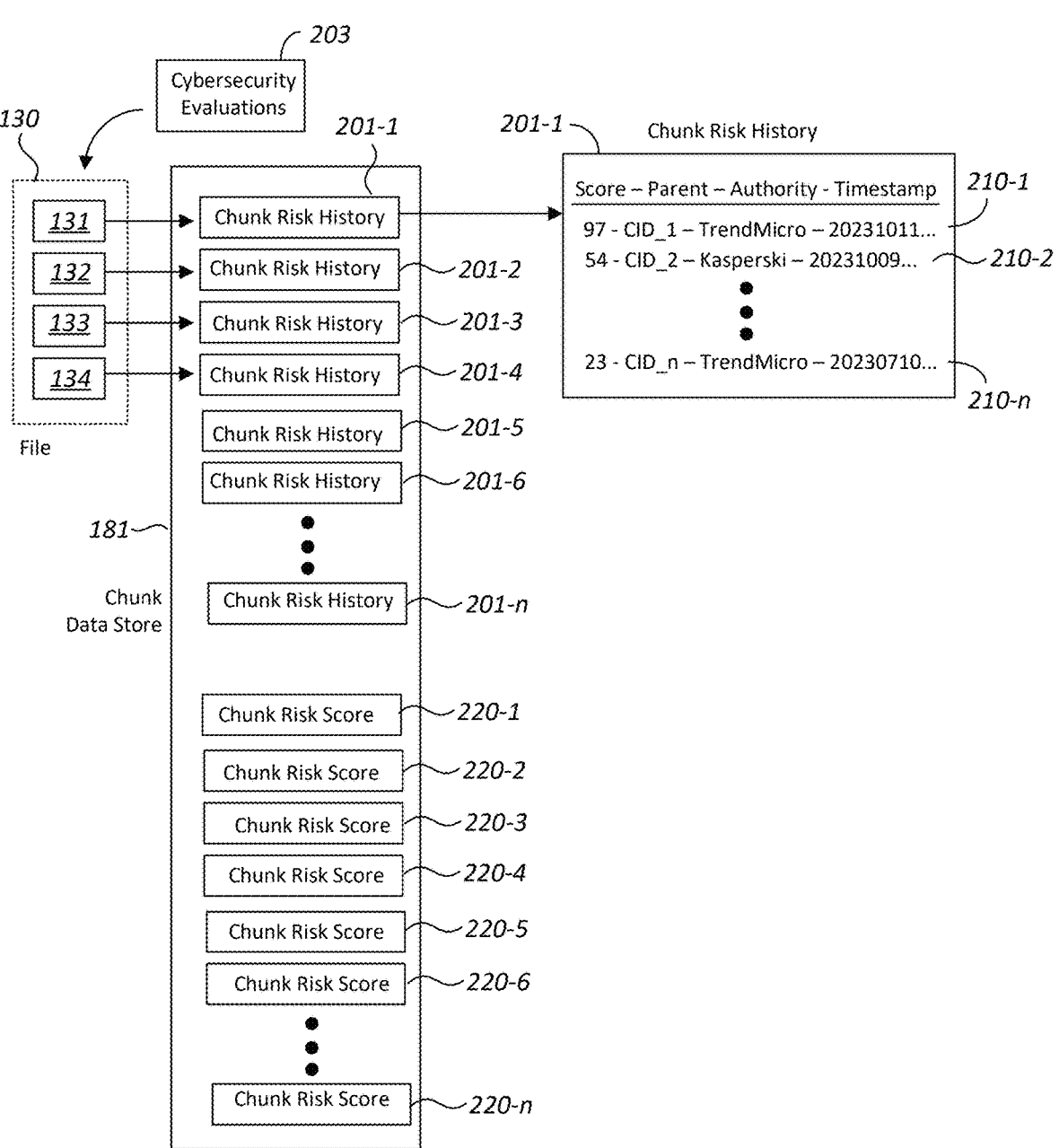
FIG. 2 shows chunk risk histories of a sample content, in accordance with an embodiment of the present invention.

FIG. 2 shows chunk risk histories of a sample content, in accordance with an embodiment of the present invention. The content is a "sample" in that it was retrieved by a probe node 171 from the DHT network 100 to evaluate the content for maliciousness, i.e., to determine if the content is malware (e.g., computer virus, phishing, ransomware).

In the example of FIG. 2, the sample content is that of a file 130 for illustration purposes. The file 130 consists of chunks 131, 132, 133, and 134, which are stored in the peer nodes 161-1, 161-2, 161-3, and 161-4, respectively, of the DHT network 100 (see FIG. 1).

In the example of FIG. 2, the chunks 131, 132, 133, and 134 have been retrieved and reassembled to form the file 130 in a probe node 171. The file 130 is provided to the backend system 180 or other computer system, where the file 130 is subjected to one or more cybersecurity evaluations 203. A cybersecurity evaluation 203 may include comparing a hash of the file 130 to an external source of threat data, such as a file reputation system, VirusTotal, etc. As another example, the cybersecurity evaluation 203 may include scanning the file 130 using conventional scanning techniques, such as antivirus scanning, sandboxing, static analysis, behavioral monitoring, etc. Yet another example, the cybersecurity evaluation 203 may include determining a reputation of the file 130 based on pre-existing (from previous cybersecurity evaluations 203) risk scores of one or more of the chunks 131, 132, 133, and 134.

Content to be prioritized for the cybersecurity evaluations 203 may be selected using a heuristic algorithm. For example, (a) select newest contents first; (b) select the most popular content (according to the recorded network metrics);

(c) select contents containing one or more chunks that already have risk scores from previous cybersecurity evaluations; and (d) cross-reference threat intelligence sources for known Indicators of Compromise (IOC) (e.g., content of a file with a filename indicated in an IOC).

Each chunk has a risk history, with each risk history having a record of each cybersecurity evaluation performed on the content that includes the chunk. In the example of FIG. 2, the chunk risk history 201-1 is the risk history of the chunk 131, the chunk risk history 201-2 is the risk history of the chunk 132, the chunk risk history 201-3 is the risk history of the chunk 133, and the chunk risk history 201-4 is the risk history of the chunk 134.

A risk history of a chunk may comprise a plurality of records, one for each cybersecurity evaluation performed on a content that includes the chunk. Each record may indicate a risk score propagated to the chunk from a cybersecurity evaluation of a content that includes the chunk, the content ID of the content that includes the chunk, the cybersecurity authority that performed the cybersecurity evaluation on the content, and a timestamp of the cybersecurity evaluation.

In the example of FIG. 2, the chunk risk history 201-1 of the chunk 131 includes a plurality of records 210 (i.e., 210-1, 210-2, 210-3, . . . , 210-n), one for each cybersecurity evaluation 203 performed on content that includes the chunk 131. As can be appreciated, the chunk 131 may be found on contents other than the file 130. Each record 210 is for content that includes the chunk 131 and indicates a risk score ("Score") of the content propagated to the chunk 131 from a cybersecurity evaluation 203, the content ID of the content ("Parent"), the cybersecurity authority ("Authority") that performed the cybersecurity evaluation 203 on the content, the timestamp ("Timestamp") of the cybersecurity evaluation 203, etc.

A risk score of a chunk may be determined based on its risk history. For example, the risk score of a chunk may be determined by considering only risk scores coming from a specific cybersecurity authority, using a consensus algorithm across multiple cybersecurity authorities, applying an exponential window to weight out older cybersecurity evaluations, averaging the risk scores, etc. In the example of FIG. 2, the chunk 131 has a chunk risk score 220-1 that is determined from the chunk risk history 201-1, the chunk 132 has a chunk risk score 220-2 that is determined from the chunk risk history 201-2, the chunk 133 has a chunk risk score 220-3 that is determined from the chunk risk history 201-3, and the chunk 134 has a chunk risk score 220-4 that is determined from the chunk risk history 201-4.

The risk score of a chunk may be pre-calculated and stored in the chunk data store 181 in the backend system 180 as in the example of FIG. 2 for convenience, or calculated on the fly upon content retrieval by each individual DHT application 151.

In the example of FIG. 2, the risk histories 201-1, 201-2, 201-3, and 201-4 and risk scores 220-1, 220-2, 220-3, and 220-4 of the chunks 131, 132, 133, and 134 of the file 130 are stored in the chunk data store 181. The chunk data store 181 also contains risk histories and risk scores of other chunks of other contents, labeled as chunk risk histories 201-5, 201-6, . . . , 201-n and chunk risk scores 220-5, 220-6, . . . , 220-n.

Embodiments of the present invention provide a risk score per chunk, rather than per an entire content. Advantageously, risk score per chunk allows new content to be evaluated for maliciousness, even when the entirety of the new content has not been evaluated. More particularly, a reputation of a target content may be determined based on pre-existing risk scores of chunks of the target content. For example, risk scores of chunks of the target content may be averaged (or processed some other suitable way) to generate an overall risk score that can be compared to a predetermined threshold to determine if the target content is malicious.

As a particular example, a seemingly harmless web folder containing a cryptomining library could have a low overall risk score, but not null, due to some of the chunks of contents in the crypto mining library having corresponding risk scores from previous evaluations of contents that include the chunks. As another particular example, standard libraries used by both malware and legitimate binaries/websites could have an overall risk score that is lower than a fully-fledged malware. Yet another particular example, chunks referring to crypto libraries disguised in seemingly harmless packages could be discovered and receive a higher risk score by being identified in multiple malicious packages. Embodiments of the present invention are thus especially advantageous in DHT networks, because of the distributed storage nature of DHT networks.

The results of the cybersecurity evaluations 203 may be extended to nodes that provide malicious content. For example, if the file 130 is found to be malicious and have originated or is referenced by a peer node 161, that peer node 161 may be identified as malicious.

Chunk risk histories and risk scores may be made available to nodes of the DHT network 100, and other computer systems, a variety of ways as now explained with reference to FIGS. 3-5.

Figure 3:
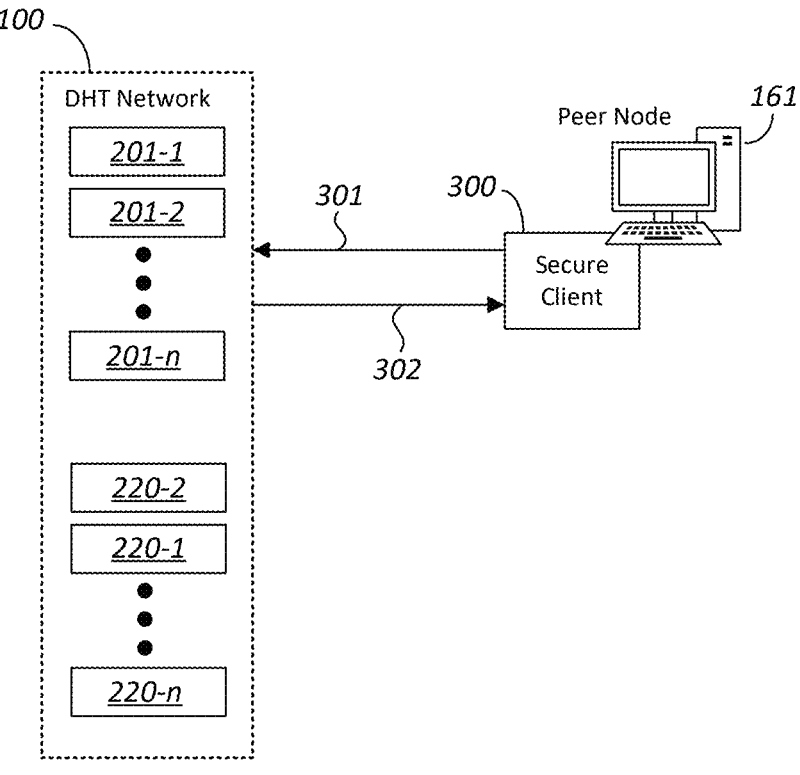
FIGS. 3-5 show block diagrams of chunk risk histories and risk scores deployment scenarios, in accordance with embodiments of the present invention.
Figure 4:
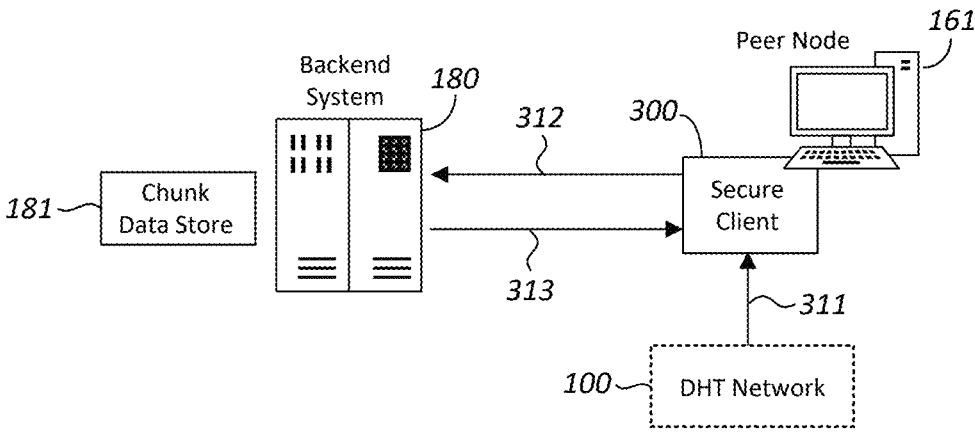
Figure 5:
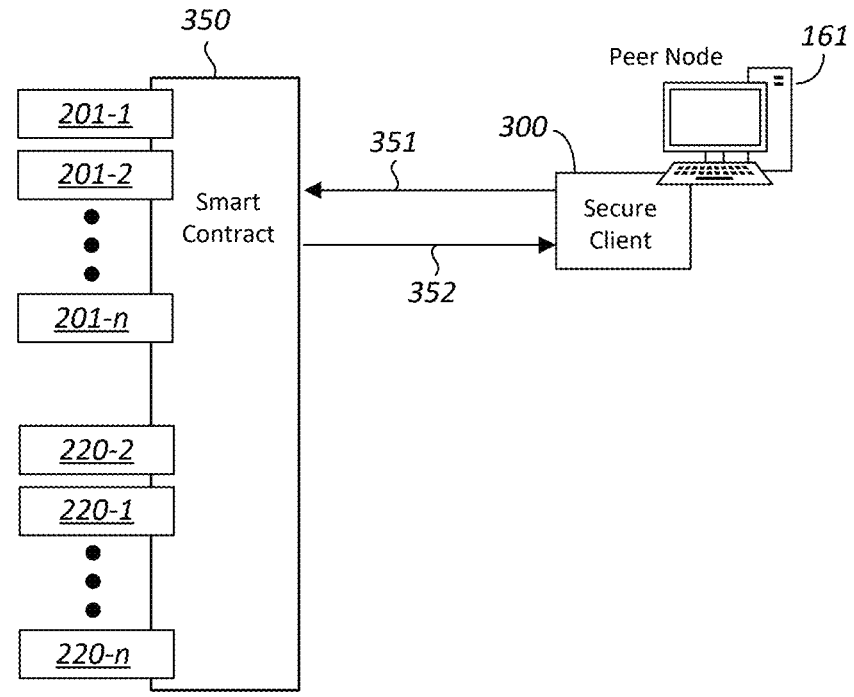

FIGS. 3-5 show a secure client 300, which may comprise program code that runs in a peer node 161 for accessing the chunk risk histories 201 to calculate chunk risk scores or retrieving pre-calculated chunk risk scores 220. The secure client 300 may work in conjunction with the DHT app 151 of the peer node 161. The secure client 300 may employ encryption, validation, or other conventional security measure to protect the integrity of the chunk risk histories 201 and the chunk risk scores 220.

In the example of FIG. 3, the chunk risk histories 201 and/or the chunk risk scores 220 are stored across the nodes of the DHT network 100. This makes the chunk risk histories 201 and/or chunk risk scores 220 available to nodes that run the secure client 300. The secure client 300 may send a message to the DHT network 100 (see arrow 301) to retrieve a chunk risk history 201 or chunk risk score 220 (see arrow 302) in accordance with the DHT algorithm of the DHT network 100. For example, when a first file consisting of a first plurality of chunks is received in the peer node 161, the secure client 300 may retrieve the chunk risk histories 201 of the first plurality of chunks from the DHT network 100, and calculate the risk scores of the first plurality of chunks based on the chunk risk histories 201 to determine a reputation of the first file based on the risk scores of the first plurality of chunks. The secure client 300 may also simply retrieve the chunk risk scores 220 of the first plurality of chunks that have been pre-calculated based on corresponding chunk risk histories to determine a reputation of the first file. In some implementations, the chunk risk histories 201 and chunk risk scores 220 may be part of the DHT protocol message metadata and be embedded with corresponding chunks.

In the example of FIG. 4, the secure client 300 communicates with the backend system 180 over an IP network. The secure client 300 may send a request to the backend system 180 (see arrow 312) for chunk risk histories 201 or chunk risk scores 220 that are stored in the chunk data store 181 (see arrow 313) In the example of FIG. 4, the secure client 300 is also configured as a DHT application. For example, when the secure client 300 receives a second file consisting of a second plurality of chunks from the DHT network 100 (see arrow 311), the secure client 300 may request the backend system 180 for the chunk histories 201 or the chunk risk scores 220 of the second plurality of chunks to determine a reputation of the second file.

In the example of FIG. 5, the chunk risk histories 201 are stored in cloud storage, block chain, or other storage location and are made available to the secure client 300 by way of a smart contract 350 as a subscription service. Subscribed peer nodes 161 may request (see arrow 351) to receive (see arrow 352) a chunk risk history 201 or chunk risk score 220 by fulfilling the requirements of the smart contract 350. For example, when the secure client 300 receives a third file consisting of a third plurality of chunks from the DHT network 100, the secure client 300 may request to receive the chunk risk histories 201 or chunk risk scores 220 of the third plurality of chunks, by way of the smart contract 350, to determine a reputation of the third file.

FIG. 6 shows a flow diagram of a method 400 of evaluating contents stored in a DHT network for maliciousness, in accordance with an embodiment of the present invention. The method 400 may be performed using components of the DHT network 100 as shown in FIG. 1. As can be appreciated, the method 400 may also be performed using other components without detracting from the merits of the present invention.

In step 401, cybersecurity evaluations are performed on sample contents that are stored across nodes of the DHT network. The sample contents may be retrieved by probe nodes. The sample contents may be evaluated for maliciousness at a backend system, at individual probe nodes, computer systems of cybersecurity authorities, or other computer system.

In step 402, corresponding risk histories of chunks of the sample contents are updated based on results of the cybersecurity evaluations. For example, a cybersecurity evaluation performed on a content may yield a risk score of the content, which is propagated to the risk history of each chunk of the content. This results in each chunk having a risk history with records of cybersecurity evaluations performed on the content and other contents that include the chunk. The chunk risk histories may be stored in the backend system, in the DHT network, or other storage location that is accessible to nodes of the DHT network. For convenience, a risk score of each chunk may be pre-calculated, based on the risk history of the chunk, and stored in the backend system, in the DHT network, or other storage location that is accessible to nodes of the DHT network.

In step 403, chunks of a target content (e.g., target file) are received by a receiving node of the DHT network from nodes of the DHT network.

In step 404, chunks of the target content that have corresponding risk histories are identified. For example, the receiving node may compare chunks of the target content to chunks that have corresponding risk histories from cybersecurity evaluations.

The reputation of the target content is determined based on the corresponding risk histories of the identified chunks of the target content, as explained in the following steps 405 and 406.

In step 405, risk scores of the identified chunks of the target content are determined based at least on corresponding risk histories of the identified chunks. For example, the receiving node may access the risk histories of the identified chunks to calculate the corresponding risk scores of the identified chunks. The receiving node may also simply access pre-calculated corresponding risk scores of the identified chunks.

In step 406, a reputation of the target content is determined based at least on corresponding risk scores of the identified chunks of the target content. The corresponding risk scores of the identified chunks may be averaged, summed, or processed some other way to generate an overall risk score of the target file. The overall risk score of the target content may be compared to a predetermined threshold to determine the reputation of the target content. For example, the target content may be deemed to have a malicious reputation when the overall risk score exceeds the threshold, and may be deemed to have a normal reputation when the overall risk score is below the threshold.

In step 407, the target content is flagged as malicious if the reputation of the target content indicates that the target content is malicious. A corrective action may be performed in response to detecting malicious content. The corrective action may include blocking the malicious content or raising an alert. As an example, malicious content may be put in quarantine, deleted, etc. by the receiving node or another computer system. As another example, the receiving node or another computer system may display a warning message on a display screen, text security personnel, record detection of the malicious content in a security log etc.

Figure 7:
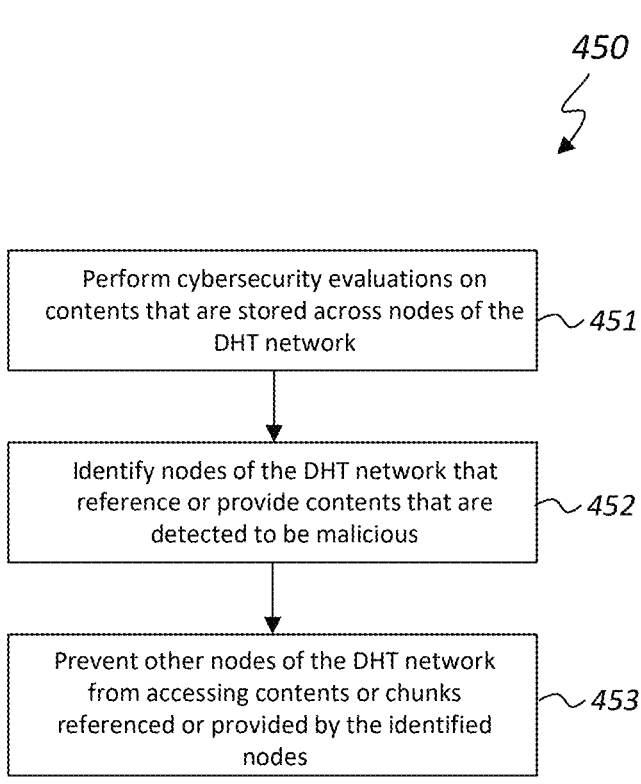
FIG. 7 shows a flow diagram of a method of identifying malicious nodes in a DHT network, in accordance with an embodiment of the present invention.

FIG. 7 shows a flow diagram of a method 450 of identifying malicious nodes in a DHT network, in accordance with an embodiment of the present invention. The method 450 may be performed using components of the DHT network 100 as shown in FIG. 1. As can be appreciated, the method 450 may also be performed using other components without detracting from the merits of the present invention.

In step 451, cybersecurity evaluations are performed on sample contents that are stored across nodes of the DHT network. The step 451 is the same as the step 401 of the method 400. Accordingly, the method 450 may be performed in conjunction with the method 400.

In step 452, nodes of the DHT network that reference or provide contents that are detected to be malicious based on the cybersecurity evaluations of step 451 are identified to be malicious. A listing of the identified malicious nodes may be compiled and maintained in a backend system or forwarded to nodes of the DHT network.

In step 453, other nodes of the DHT network are prevented from accessing contents referenced or provided by the identified malicious nodes. For example, step 453 performed in a node of the DHT network may include blocking, at the node, contents or chunks of contents that are referenced or provided by the identified malicious nodes. As another example, step 453 performed at a backend system or other computer system that has some control over the DHT network may include initiating removal of the identified malicious nodes from the DHT network.

Figure 8:
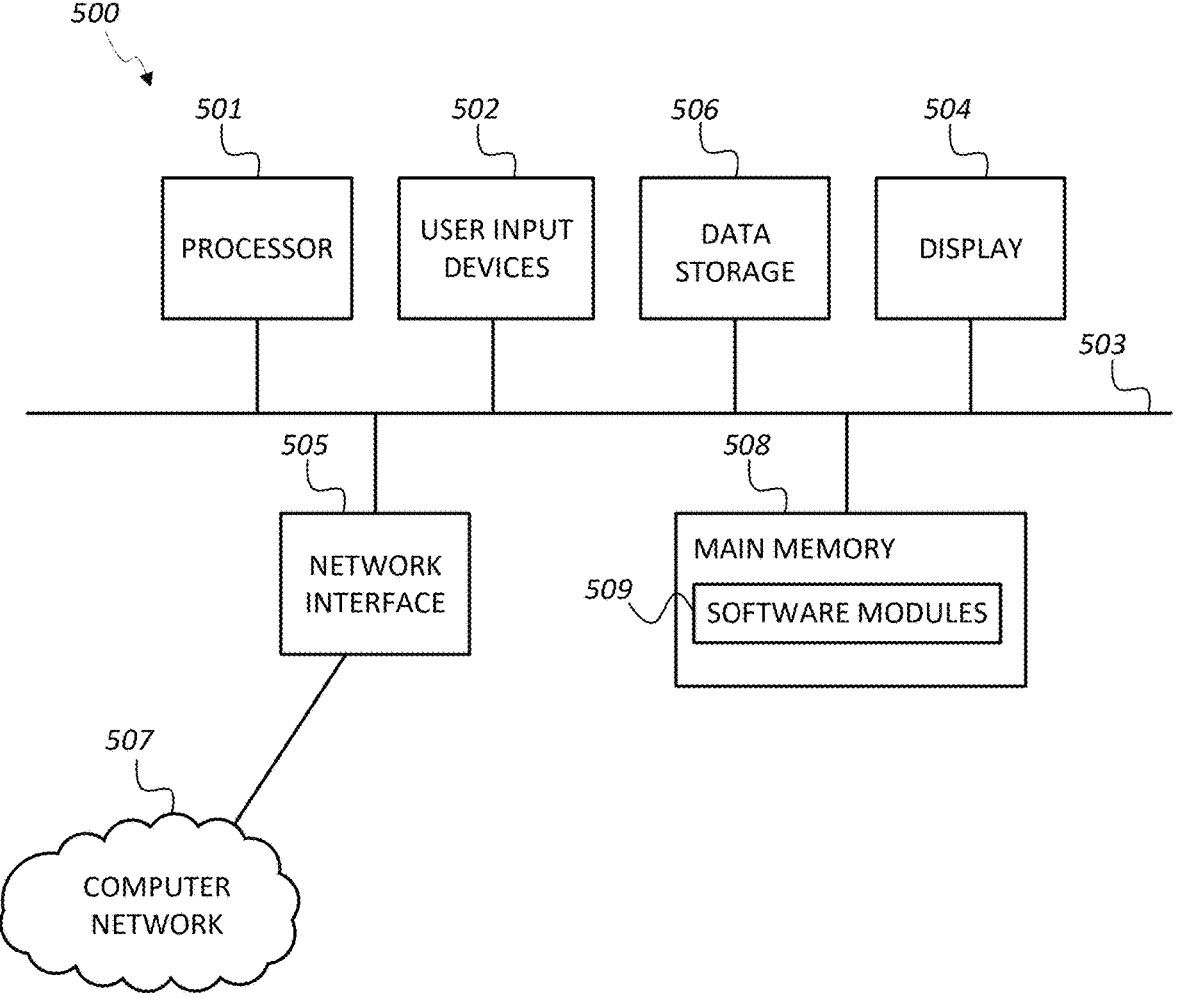
FIG. 8 shows a block diagram of a computer system that may be employed with embodiments of the present invention.

FIG. 8 shows a block diagram of a computer system 500 that may be employed with embodiments of the present invention. The computer system 500 may be employed as a node of a DHT network, as a backend system, or other computer system described herein. The computer system 500 may have fewer or more components to meet the needs of a particular cybersecurity application. The computer system 500 may include one or more processors 501. The computer system 500 may have one or more buses 503 coupling its various components. The computer system 500 may include one or more user input devices 502 (e.g., keyboard, mouse), one or more data storage devices 506 (e.g., hard drive, optical disk, solid state drive), a display screen 504 (e.g., liquid crystal display, flat panel monitor), a computer network interface 505 (e.g., network adapter, modem), and a main memory 508 (e.g., random access memory). The computer network interface 505 may be coupled to a computer network 507, which in this example includes the public Internet.

The computer system 500 is a particular machine as programmed with one or more software modules 509, comprising instructions stored non-transitory in the main memory 508 for execution by at least one processor 501 to cause the computer system 500 to perform corresponding programmed steps. An article of manufacture may be embodied as computer-readable storage medium including instructions that when executed by at least one processor 501 cause the computer system 500 to be operable to perform the functions of the one or more software modules 509.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of evaluating contents stored in a Distributed Hash Table (DHT) network for maliciousness, the method comprising:

performing cybersecurity evaluations on a plurality of sample files that are distributed across nodes of a Distributed Hash Table (DHT) network, wherein the cybersecurity evaluations assign a file risk score to each of the plurality of sample files;

updating corresponding risk histories of a plurality of chunks of the plurality of sample files based on results of the cybersecurity evaluations by propagating the file risk score of each of the plurality of sample files to each corresponding chunk;

receiving a plurality of chunks of a target file from nodes of the DHT network;

identifying a set of chunks of the plurality of chunks of the target file that each has a corresponding risk history from the cybersecurity evaluations;

determining a reputation of the target file based on corresponding risk histories of the set of chunks of the plurality of chunks of the target file;

flagging the target file as malicious in response to the reputation of the target file indicating that the target file is malicious;

detecting a malicious file among the plurality of sample files; and flagging as malicious a first node of the DHT network that points to or provides a chunk of the malicious file.

2. The method of claim 1, further comprising:

in response to flagging the first node as malicious, preventing a second node of the DHT network from receiving a chunk of a content from the first node.

3. The method of claim 1, wherein determining the reputation of the target file comprises:

calculating a chunk risk score of each chunk of the plurality of chunks of the plurality of sample files based on a risk history of the chunk;

storing chunk risk scores of the plurality of chunks of the plurality of sample files in a storage location;

retrieving, from the storage location, corresponding chunk risk scores of the set of chunks of the plurality of chunks of the target file;

calculating an overall risk score of the target file from the corresponding chunk risk scores of the set of chunks of the plurality of chunks of the target file; and comparing the overall risk score of the target file to a threshold.

4. The method of claim 3, wherein the storage location comprises nodes of the DHT network.

5. The method of claim 1, wherein determining the reputation of the target file comprises:

retrieving the corresponding risk histories of the set of chunks of the plurality of chunks of the target file from a storage location;

calculating corresponding chunk risk scores of the set of chunks of the plurality of chunks of the target file based on the corresponding risk histories of the set of chunks of the plurality of chunks of the target file;

calculating an overall risk score of the target file from the corresponding chunk risk scores of the set of chunks of the plurality of chunks of the target file; and comparing the overall risk score of the target file to a threshold.

6. The method of claim 5, wherein the storage location comprises nodes of the DHT network.

7. A system for evaluating contents stored in a Distributed Hash Table (DHT) network for maliciousness, the system comprising:

a plurality of peer nodes, each of the plurality of peer nodes being a node of the DHT network and comprising a computer system that stores one or more chunks of a plurality of contents stored in the DHT network;

a plurality of probe nodes, each of the plurality of probe nodes being a node of the DHT network and comprising a computer system that collects network traffic data of the DHT network, wherein a peer node of the plurality of peer nodes comprises at least one processor and a memory, the memory of the peer node storing instructions that when executed by the at least one processor of the peer node cause the peer node to:

receive a plurality of chunks of a target content;

identify a set of chunks of the plurality of chunks of the target content that each has a risk history from cybersecurity evaluations performed on a plurality of sample contents; and determine a reputation of the target content based on corresponding risk histories of the set of chunks of the plurality of chunks of the target content; and a backend system comprising at least one processor and a memory, the memory of the backend system storing instructions that when executed by the at least one processor of the backend system cause the backend system to:

perform the cybersecurity evaluations on the plurality of sample contents, wherein the cybersecurity evaluations assign a content risk score to each of the plurality of sample contents;

update corresponding risk histories of a plurality of chunks of the plurality of sample contents based on results of the cybersecurity evaluations by propagating the content risk score of each of the plurality of sample contents to each corresponding chunk;

detect a malicious content among the plurality of sample contents; and flag as malicious a first node of the DHT network that points to or provides a chunk of the malicious content.

8. The system of claim 7, wherein the backend system that provides the corresponding risk histories of the set of chunks of the plurality of chunks of the target content to the peer node of the plurality of peer nodes.

9. The system of claim 7, wherein the corresponding risk histories of the set of chunks of the plurality of chunks of the target content are stored across the plurality of peer nodes.

10. The system of claim 7, wherein the instructions stored in the memory of the peer node, when executed by the at least one processor of the peer node, cause the peer node to determine the reputation of the target content by:

calculating corresponding chunk risk scores of the set of chunks of the plurality of chunks of the target content from the corresponding risk histories of the set of chunks of the plurality of chunks of the target content;

calculating an overall risk score of the target content based on the corresponding chunk risk scores of the set of chunks of the plurality of chunks; and comparing the overall risk score of the target content to a threshold.

11. The system of claim 7, wherein the instructions stored in the memory of the peer node, when executed by the at least one processor of the peer node, cause the peer node to determine the reputation of the target content by:

retrieving corresponding chunk risk scores of the set of chunks of the plurality of chunks of the target content that have been calculated from the corresponding risk histories of the set of chunks of the plurality of chunks of the target content;

calculating an overall risk score of the target content based on the corresponding chunk risk scores of the set of chunks of the plurality of chunks; and comparing the overall risk score of the target content to a threshold.

\* \* \* \* \*